US012751353B2

(12) United States Patent
Lundkvist et al.

(10) Patent No.: US 12,751,353 B2
(45) Date of Patent: Oct. 6, 2026

(54) ROBOTIC MOWER AND A METHOD FOR NAVIGATING THE ROBOTIC MOWER

(71) Applicant: Greenworks (Jiangsu) Co., Ltd, Changzhou (CN)

(72) Inventors: Andre Lundkvist, Habo (SE); Amir Mustedanagic, Huskvarna (SE)

(73) Assignee: Greenworks (Jiangsu) Co., Ltd, Changzhou (CN)

( * ) Notice: Subject to any disclaimer, the term of this patent is extended or adjusted under 35 U.S.C. 154(b) by 19 days.

(21) Appl. No.: 19/010,158

(22) Filed: Jan. 5, 2025

(65) Prior Publication Data

US 2025/0127081 A1 Apr. 24, 2025

Related U.S. Application Data

(63) Continuation of application No. PCT/CN2023/126061, filed on Oct. 24, 2023.

(51) Int. Cl.
*A01D 34/00* (2006.01)

(52) U.S. Cl.
CPC .................................. *A01D 34/008* (2013.01)

(58) Field of Classification Search
CPC .................................................... A01D 34/008
See application file for complete search history.

(56) References Cited

U.S. PATENT DOCUMENTS 5,944,132 A 8/1999 Davies et al.
11,192,248 B2 * 12/2021 Voorhies ................ G06Q 10/08
2021/0018927 A1 * 1/2021 Ackerman ........... G05D 1/0268
2021/0373562 A1 * 12/2021 Bousani ............... G05D 1/0274
2022/0124973 A1 * 4/2022 Juel ....................... A01D 34/008
2026/0044156 A1 * 2/2026 Wang ..................... G05D 1/243

FOREIGN PATENT DOCUMENTS

CN 113272753 A 8/2021
WO 2020143972 A1 7/2020

OTHER PUBLICATIONS

Extended European Search Report of Counterpart European Patent Application No. 24208283.2 issued on Jun. 12, 2025.
International Search Report of PCT Patent Application No. PCT/CN2023/126061 issued on Dec. 15, 2023.

* cited by examiner

*Primary Examiner* — Jess Whittington

(57) ABSTRACT

A method for navigating a robotic mower (2) limited by a boundary (6), and a robotic mower (2) configured to perform the method. The robotic mower (2) repeatedly determines (S100) its position by means of a positioning unit (8), navigates (S102) based on the determined position, determines (S104) that a new position of the robotic mower (2) cannot be accurately obtained, determines (S106) a position uncertainty distance (R) based on the positions obtained by the positioning unit (8) and a dead reckoning sensor (10) provided in the robotic mower (2), calculates (S108) a distance (D) to the closest boundary, determines (S110) a navigation margin as the difference between the distance (D) to the closest boundary (6) and the position uncertainty distance (R), and executes (S112) a safety operation if the navigation margin equals a predetermined value.

15 Claims, 6 Drawing Sheets

ROBOTIC MOWER AND A METHOD FOR NAVIGATING THE ROBOTIC MOWER

CROSS REFERENCE TO RELATED APPLICATIONS

The present application is a Continuation Application of PCT Application No. PCT/CN2023/126061 filed on Oct. 24, 2023, the contents of which are incorporated herein by reference in their entirety.

TECHNICAL FIELD

The present invention relates generally to a robotic mower for performing navigation and a method for navigating the robotic mower. The present invention also relates to a computer program implementing the method.

BACKGROUND ART

Self-propelled robotic mowers have become more and more popular and are now widely used to cut grass within a predetermined work area. The work area is typically limited by boundary wires to ensure that the robotic mower does not move outside the work area and in order to prevent that the robotic mower, objects or living beings get damaged or injured. In newer versions of robotic mowers there are no longer any need for boundary wires. Instead, the robotic mower is provided with a positioning unit used to determine the position of the robotic mower and the robotic mower is allowed to move within a boundary of a predefined work area. If the position obtained by the positioning unit cannot be reliably obtained the robotic mower is stopped as a safety measure.

One example of such a robotic mower is described in WO2020143972, which discloses a method in which a distance from a position determined by a positioning unit of the robotic mower to the boundary is estimated as a boundary distance. The boundary distance is used to set a maximum dead reckoning navigating distance. If a new reliable position cannot be determined before the maximum dead reckoning navigating distance has been reached a safety operation is initiated.

Even if WO2020143972 solves some of the problems of securely keeping the robotic mower within a work area there are still improvements to be made. Especially when it comes to increasing the accuracy of determining the position of the robotic mower and decreasing the maximum dead reckoning distance which the robotic mower needs to travel when position cannot be reliably obtained.

Thus, there is a need for a more accurate and robust solution for navigating the robotic mower when there is uncertainty in determining the position of the robotic mower.

SUMMARY OF INVENTION

An objective of the present invention is to accomplish a more accurate and robust navigation for a robotic mower when there is an uncertainty in determining the position with a positioning unit.

According to an aspect of the invention a method for navigating a robotic mower within a work area is disclosed. The work area is limited by a boundary and the method comprises, repeatedly determining a position of the robotic mower by means of a positioning unit provided in or arranged on the robotic mower, navigating the robotic mower within the work area based on the determined position, determining that a new position of the robotic mower cannot be accurately obtained, determining a position uncertainty distance based on the positions obtained by the positioning unit and a dead reckoning sensor provided in the robotic mower, calculating a distance to the closest boundary, determining a navigation margin as the difference between the distance to the closest boundary and the position uncertainty distance, and executing a safety operation if the navigation margin equals a predetermined value.

In another embodiment of the method further comprises the steps of generating a trajectory of the positions determined by the positioning unit while the robotic mower navigates, generating a trajectory of the positions determined by the dead reckoning sensor while the robotic mower navigates, aligning by moving at least one of the generated trajectories within a 2D or 3D coordinate system for minimisation of the distance between the trajectories resulting in aligned trajectories, calculating a metric of difference between the aligned trajectories for quantifying the alignment quality of the aligned trajectories, and determining the position uncertainty distance as the metric of difference between the aligned trajectories.

In yet another embodiment the position determined by the positioning unit is determined by using any one of a Real-Time Kinematic (RTK) unit, a Global Positioning System (GPS) unit, and a Differential Global Navigation Satellite Systems (DGNSS) unit or any combination thereof.

In another embodiment of the method further comprises repeatedly determining a position of an RTK base station with a positioning unit provided in the RTK base station, and wherein determining the position of the RTK base station with the positioning unit is performed with a fixed time interval of between 5 to 15 seconds.

In yet another embodiment of the method the determining of the position of the robotic mower with the positioning unit and the dead reckoning sensor is performed with a fixed frequency of 8 to 12 Hz, preferably with a fixed frequency of 10 Hz.

In one embodiment of the method executing the safety operation comprises any one of, stopping the robotic mower to move, stopping the robotic mower to move more than a robotic mower length outside the boundary, and reversing or turning the robotic mower for navigating the robotic mower in the direction from the boundary, or any combination thereof.

In yet another embodiment of the method the distance to the closest boundary is the distance between the position determined by the positioning unit and any one of, the substantially closest point on the closest boundary, the substantially closest point on the closest boundary in the mowing direction of the robotic mower, and the substantially closest point on the closest boundary that the robotic mower risks traversing based on a preplanned trajectory, or any combination thereof.

According to another aspect of the invention a robotic mower for performing navigating within a work area is disclosed. The work area is limited by a boundary and the robotic mower comprises a positioning unit, a dead reckoning sensor, a controller comprising a processor and a memory, wherein the memory comprises instructions which when executed by the processer causes the mower to: repeatedly determine a position of the robotic mower by means of the positioning unit, navigate the robotic mower within the work area based on the determined position, determine that a new position of the robotic mower cannot be accurately obtained, determine a position uncertainty distance based on the positions obtained by the positioning unit and the dead reckoning sensor, calculate a distance to the closest boundary, determine a navigation margin as the difference between the distance to the closest boundary and the position uncertainty distance, and execute a safety operation if the navigation margin equals a predetermined value.

In an embodiment the robotic mower is further configured to generate a trajectory of the positions determined by the positioning unit while the robotic mower navigates, generate a trajectory of the positions determined by the dead reckoning sensor while the robotic mower navigates, align by moving at least one of the generated trajectories within a 2D or 3D coordinate system for minimisation of the distance between the trajectories resulting in aligned trajectories, calculate a metric of difference between the aligned trajectories for quantifying the alignment quality of the aligned trajectories, and determine the position uncertainty distance as the metric of difference between the aligned trajectories.

In yet another embodiment the positioning unit is any one of a Real-Time Kinematic (RTK) unit, a Global Positioning System (GPS) unit and a Differential Global Navigation Satellite Systems (DGNSS) unit or any combination thereof.

In an embodiment the robotic mower is further configured to repeatedly determine, with a fixed time interval of between 5 to 15 seconds, a position of an RTK base station with a positioning unit provided in the RTK base station.

In another embodiment the robotic mower is further configured to determine the position of the robotic mower with the positioning unit and the dead reckoning sensor using a fixed frequency of 8 to 12 Hz, preferably using a fixed frequency of 10 Hz.

In yet another embodiment the robotic mower is further configured to execute the safety operation according to any one of stopping the robotic mower to move, stopping the robotic mower to move more than a robotic mower length outside the boundary, and reversing or turning the robotic mower for navigating the robotic mower in the direction from the boundary or any combination thereof.

In another embodiment the distance to the closest boundary is the distance between the position determined by the positioning unit and any one of the substantially closest point on the closest boundary, the substantially closest point on the closest boundary in the mowing direction of the robotic mower, and the substantially closest point on the closest boundary that the robotic mower risks traversing based on a preplanned trajectory or any combination thereof.

According to another aspect of the invention a computer program is disclosed, comprising computer program code, wherein the computer program code is adapted, if executed by the processer of the controller, to implement the methods described above.

Thus, by determining a position uncertainty distance and using this information and the distance to the boundary a safe and reliable navigation of the robotic mower is executed.

Furthermore, by using information from both the positioning unit and the dead reckoning sensor when determining the position uncertainty distance it is possible to achieve a more accurate and robust navigation for the robotic mower, which in the end also leads to a more efficient mowing process.

Moving at least one of the generated trajectories may be conducted by rotating and/or translating at least one of the generated trajectories within said 2D or 3D coordinate system.

Three examples of common methods, among others, for calculating the metric of difference and the minimisation of the distance between the trajectories are root mean square error, using the maximum distance between any of the corresponding pairs of the positions determined by the positioning unit and the dead reckoning sensor respectively, and using the distance between the last corresponding pair of the positions determined by the positioning unit and the dead reckoning sensor respectively.

BRIEF DESCRIPTION OF DRAWINGS

The invention will now be described, by way of example, with reference to the accompanying drawings, in which.

DESCRIPTION OF EMBODIMENTS

Figure 1:
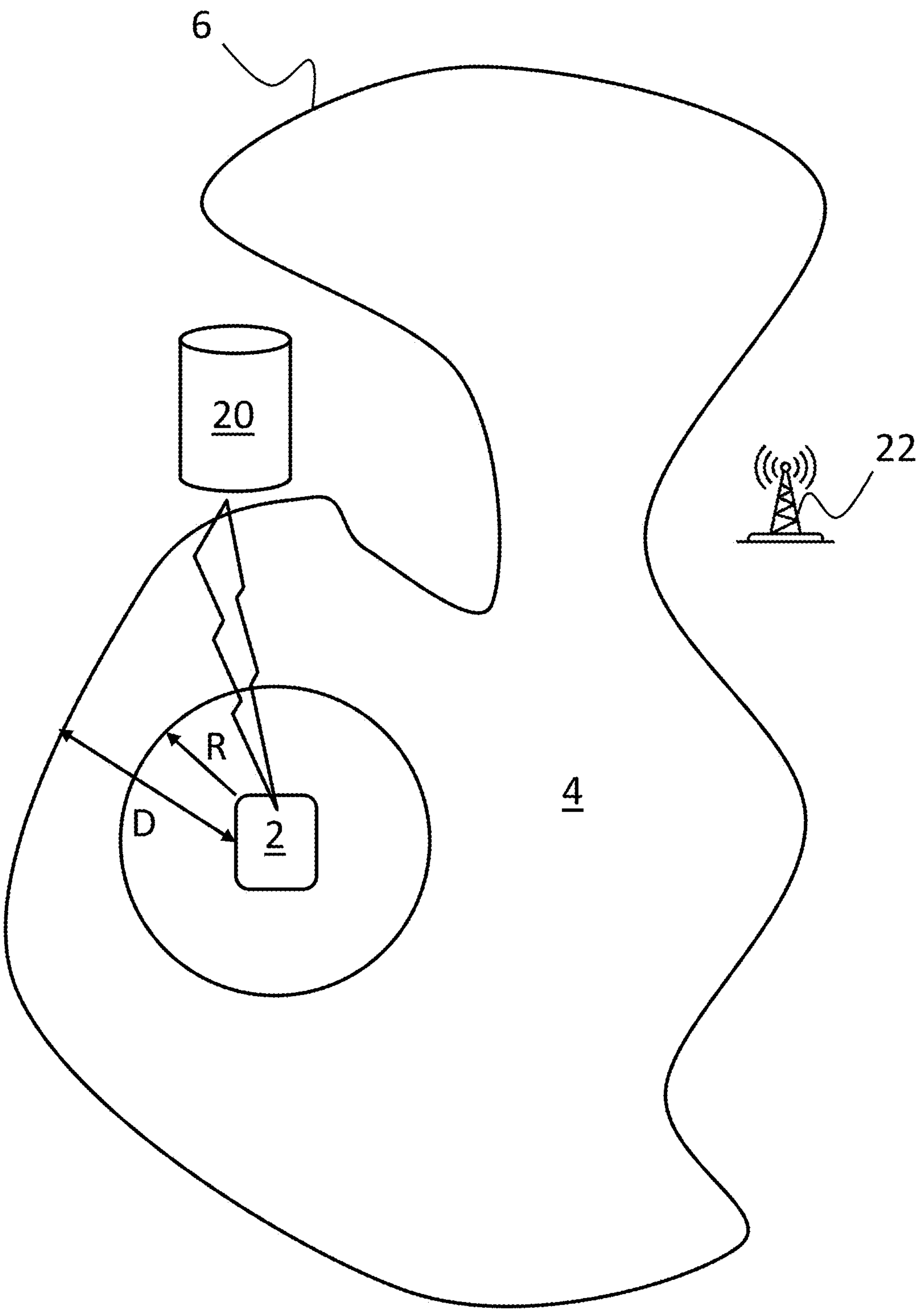
FIG. 1 is a schematic view of a work area, wherein the robotic mower is clearly inside the boundaries of the work area.
Figure 2:
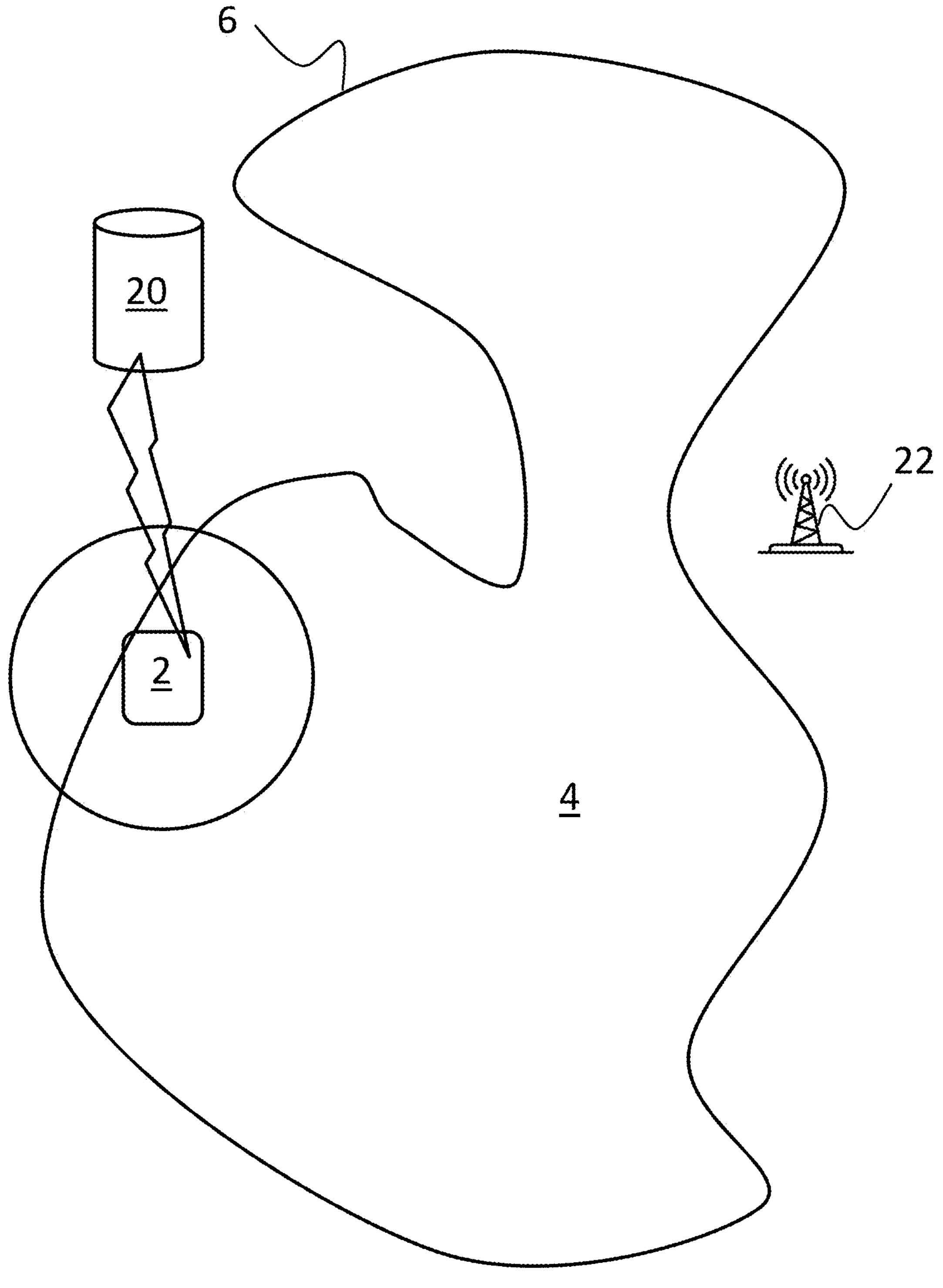
FIG. 2 is a schematic view of a work area, wherein the robotic mower is close to the boundary of the work area.

FIG. 1 and FIG. 2 show a schematic over of a robotic mower 2 operating in a work area 4, which is delimited by a boundary 6. The robotic mower 2, see FIG. 4, comprises a positioning unit 8, a dead reckoning sensor 10 and a controller 12 comprising a processor 14 and a memory 16. The robotic mower 2 also comprises one or motors, wheels and cutting tools, which all are known in the art and will therefore not be described any further. One motor may be used to propel the robotic mower 2 and another motor may be used to drive the cutting tool. The robotic mower 2 is controlled by the controller 12 which is connected to the positioning unit 8, the dead reckoning sensor 10, other sensors where applicable, actuators, and different communication interfaces to control the robotic mower 2. The processer 14 may be any device capable to execute instructions stored in the memory 16. Different combinations of general and specific application integrated circuits may be used to realise the controller.

The positioning unit 8 may use any wireless technique to the determine the position of the robotic mower 2, but is preferably a Real-Time Kinematic (RTK) unit, a Global Positioning System (GPS) unit, or a Differential Global Navigation Satellite Systems (DGNSS) unit or any suitable combination thereof.

In the vicinity to the work area 4, there is also an RTK base station 22 provided with a positioning unit for determining the position of the RTK base station 22. As is well known in the art the RTK base station 22 can communicate wirelessly with the positioning unit 8 provided in the robotic mower 2 for communication of information there in between, such as information about the position of the RTK base station to the robotic mower 2. The robotic mower may also be able to communicate wirelessly with an external database 20. Such a database 20 can be provided as a cloud service or provided in a server connected to the RTK base station 22.

Figure 3A:
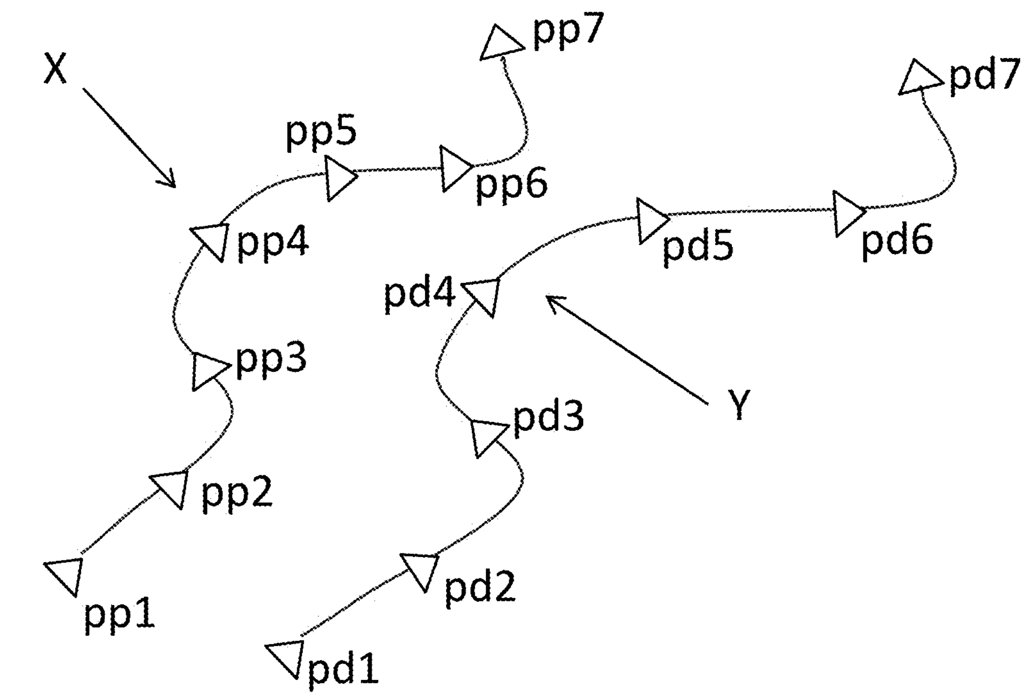
FIGS. 3*a* and 3*b* are illustrations describing features of an embodiment of the method according to the present invention.

FIG. 3*a* shows the generated trajectory X of the positions pp1 to pp7 determined by the positioning unit 8 while the robotic mower 2 navigates. It also shows the generated trajectory Y of the positions pd1 to pd7 determined by the dead reckoning sensor 10 while the robotic mower 2 navigates.

Figure 3B:
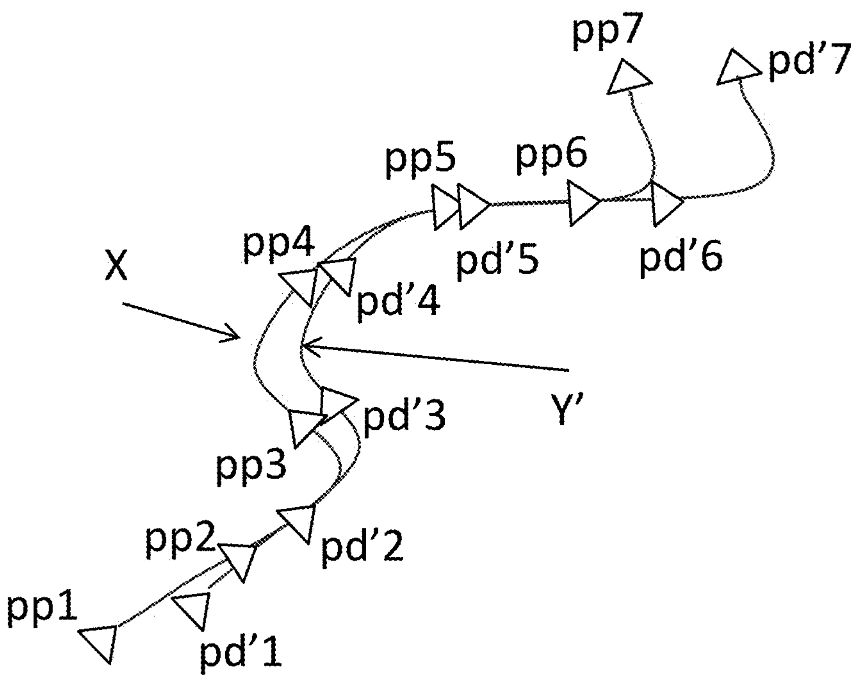

FIG. 3*b* shows the aligned trajectories X, Y' when an alignment by moving the generated trajectory Y within a 2D or 3D coordinate system for minimisation of the distance between the trajectories X, Y have been made. Subsequently after this a calculation of a metric of difference MOD between the aligned trajectories X, Y' for quantifying the alignment quality of the aligned trajectories X, Y' is made. Finally, a determination of the position uncertainty distance R as the metric of difference MOD between the aligned trajectories X, Y' is made. An alignment of the trajectories X, Y can also be made by moving the generated trajectory X, or by moving the generated trajectories X and Y.

Figure 4:
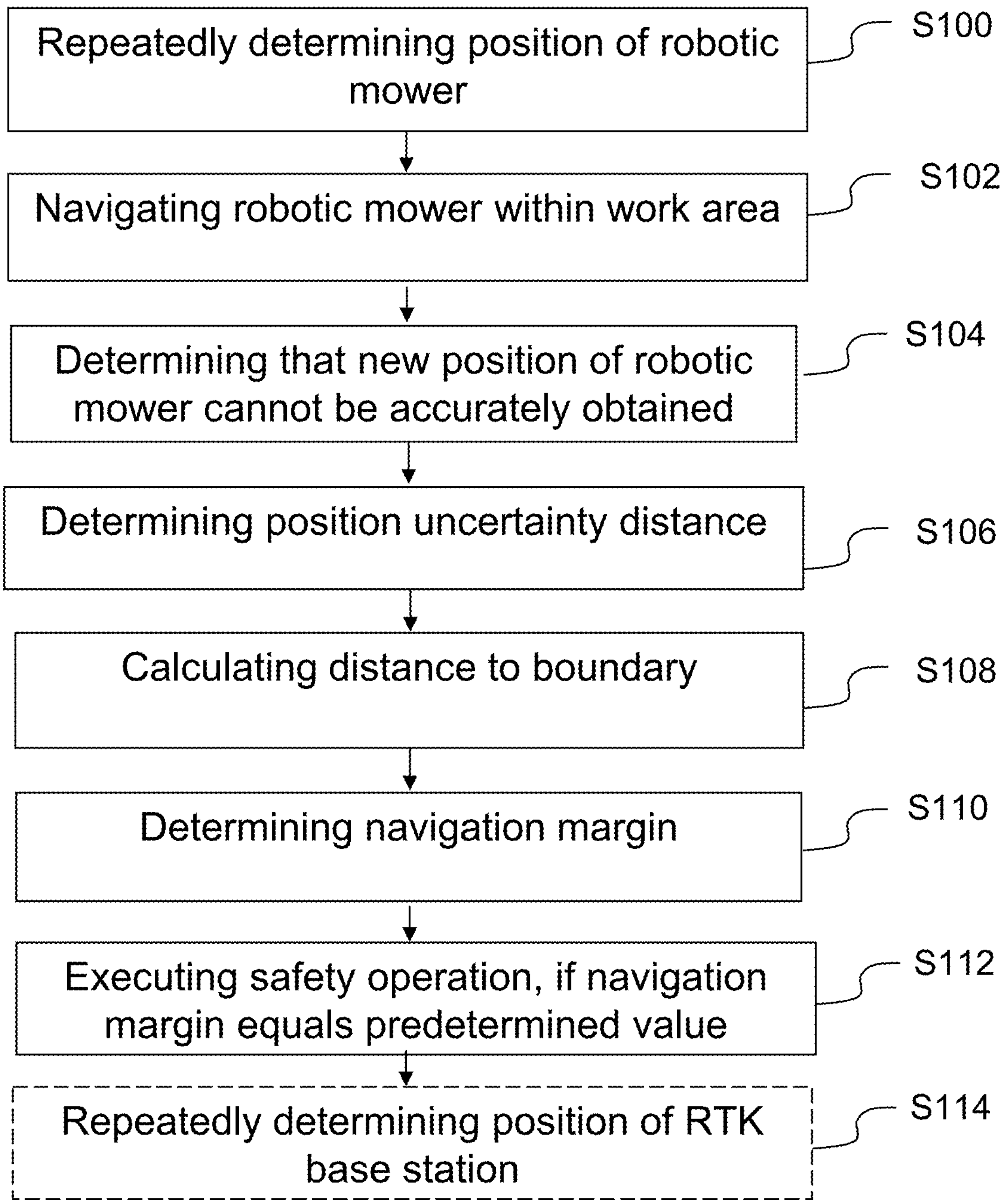
FIG. 4 is a flow chart showing the method according to the present invention.

Turning now to FIG. 4, a method for navigating the robotic mower 2 within the work area 4 will be described. As mentioned above the work area 4 is limited by the boundary 6. In step S100 of the method the position of the robotic mower 2 is repeatedly determined by means of the positioning unit 8. The positioning unit 8 may use any wireless technique to the determine the position of the robotic mower 2. The position is as mentioned above repeatedly determined, i.e. more or less continuously determined. In an embodiment the positioning unit 8 determines the position of the robotic mower 2 with a fixed frequency, such as a fixed frequency of 8 to 12 Hz, preferably with a fixed frequency of 10 Hz.

In step S102 the robotic mower 2 is navigated within the work area 4 based on the determined position. In step S104 it is determined that a new position of the robotic mower 2 cannot be accurately obtained. There can be many reasons that the position cannot be accurately obtained. For example, the RTK, GPS or DGNSS coverage may be poor due to trees or other obstacles blocking the wireless signal or the wireless signal quality is poor. Thus, if the controller 12 in the robotic mower 2 determines in step S104 that the position cannot be obtained accurately enough a position uncertainty distance R is calculated in step S106. The decision that the position is not accurate enough may be based on different thresholds for the signals received by the positioning unit 8, which is believed to be known to a person skilled in the art.

In step S106 the position uncertainty distance R is determined by the controller 12 based on both the positions obtained by the positioning unit 8 and the positions obtained by the dead reckoning sensor 10.

The position uncertainty distance R can be seen in FIG. 1 surrounding the robotic mower 2 as a circle having the radius R. This means that the robotic mower 2 is not necessarily at the indicated position in FIG. 1 and FIG. 2, but somewhere within the circle. In FIG. 1 this is not a problem, since the entire circle is within the boundary 6, which means that also the robotic mower 2 for sure is within the boundary 6. In FIG. 2, part of the circle is outside the boundary 6, which means that also the robotic mower 2 potentially may be outside the work area 4. Due to safety reasons, it is important that the robotic mower 2 does not leave the work area 4, or at least not with more than a robotic mower length outside the boundary, or at least not with more than what any applicable robot standard stipulates.

The determination of the position uncertainty distance R in step S106 is based on the positions obtained by the positioning unit 8 and the dead reckoning sensor 10 provided in the robotic mower 2.

Figure 5:
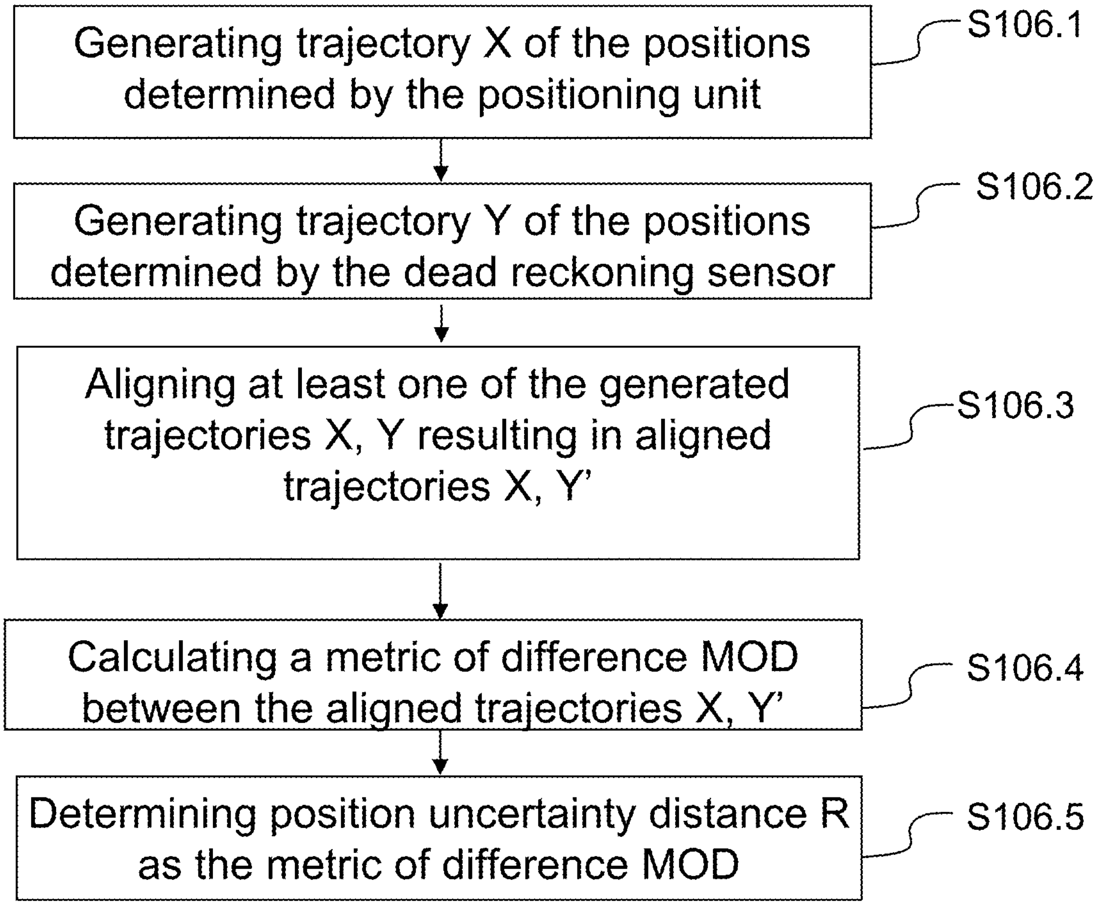
FIG. 5 is a flow chart showing the method according to an embodiment of the present invention.

The position uncertainty distance R in step S106 may be calculated using different methods. In FIG. 5, an embodiment of one such method is disclosed. In step S106.1 a trajectory X is generated of the positions pp1 . . . n determined by the positioning unit 8 while the robotic mower 2 navigates. Furthermore in step S106.2 a trajectory Y of the positions pd1 . . . n determined by the dead reckoning sensor 10 is generated while the robotic mower 2 navigates. An alignment is conducted in step S106.3 by moving at least one of the generated trajectories X, Y within a 2D or 3D coordinate system for minimisation of the distance between the trajectories X, Y resulting in aligned trajectories X, Y'. In step S106.4 a calculation of a metric of difference MOD between the aligned trajectories X, Y' is conducted for quantifying the alignment quality of the aligned trajectories X, Y'. Finally in step S106.5 the position uncertainty distance R is determined as the metric of difference MOD between the aligned trajectories X, Y'.

The positions obtained by the dead reckoning sensor 10 is as the positioning unit 8 also made repeatedly, and may be made with the same frequency as the positioning unit 8. The dead reckoning sensor 10 may determine the position of the robotic mower 2 with a fixed frequency of 8 to 12 Hz. The dead reckoning sensor 10 may also determine the position of the robotic mower 2 with a fixed frequency of 10 Hz.

In step S108 a distance D to the closest boundary is calculated. The distance D to the closest boundary 6 may be the distance between the position determined by the positioning unit 8 and any one of the substantially closest point on the closest boundary 6, the substantially closest point on the closest boundary 6 in the mowing direction of the robotic mower 2, and the substantially closest point on the closest boundary 6 that the robotic mower 2 risks traversing based on a preplanned trajectory or any combination thereof.

In step S110 a navigation margin is determined as the difference between the distance D to the closest boundary 6 and the position uncertainty distance R. The navigation margin, D-R, is to be understood as the maximum distance the robotic mower 2 can travel when it has been determined that a new position of the robotic mower 2 cannot be accurately obtained, taking the distance to the boundary and the position uncertainty distance into account.

In step S112 a safety operation is executed if the navigation margin, D-R, equals the predetermined value and no accurate position can be obtained by the positioning unit 8. The robotic mower 2 continues to navigate until the navigation margin, D-R, equals the predetermined value and no accurate position can be obtained by the positioning unit 8 or a new position from the positioning unit 8 can be accurately obtained. If a new position from the positioning unit 8 can be accurately obtained the operation of the robotic mower 2 can be continued since the robotic mower 2 with the accurately obtained position safely can be controlled within the work area 4.

The execution of the safety operation may be done in different ways. In one embodiment executing the safety operation comprises to either stop the robotic mower 2 to move, to stop the robotic mower 2 to move more than a robotic mower 2 length outside the boundary, or to reverse or turn the robotic mower 2 for navigating the robotic mower 2 in the direction from the boundary 6. These three safety operations could be combined in any way.

To further increase the accuracy in determining the position of the robotic mower 2, the position data of the RTK base station 22 can be used to determine the accuracy of the position obtained by the positioning unit 8 in the robotic mower. Thus, the controller 12 of the robotic mower 2 may in an optional step, S114, repeatedly determine the position of the RTK base station 22 by requesting this information from the RTK base station 22. This time interval for such requests is preferably once every 5 to 15 seconds, and most preferably once every 10 seconds.

The present invention relates to a robotic mower that performs the methods described above, i.e. navigating within a work area 4, wherein the work area 4 is limited by a boundary 6. The robotic mower 2 comprising a positioning unit 8, a dead reckoning sensor 10, a controller 12 comprising a processor 14 and a memory 16, the memory 16 comprising instructions which when executed by the processer 14 causes the mower to: repeatedly determine a position of the robotic mower 2 by means of the positioning unit 8, navigate the robotic mower 2 within the work area 4 based on the determined position, determine that a new position of the robotic mower 2 cannot be accurately obtained, determine a position uncertainty distance R based on the positions obtained by the positioning unit 8 and the dead reckoning sensor 10, calculate a distance D to the closest boundary 6, determine a navigation margin as the difference between the distance D to the closest boundary 6 and the position uncertainty distance R, and execute a safety operation if the navigation margin equals a predetermined value.

The method executes a safety operation if the navigation margin equals a predetermined value, otherwise it may continue navigating the robotic mower.

The predetermined value could equal zero. It could also equal any positive value, which would result in the robotic mower 2 keeping a safety distance to the boundary 6. It could also equal any negative value, which would imply that the robotic mower 2 would surpass the boundary 6.

Furthermore, the robotic mower 2 is also configured to perform all of the different embodiments of the method for navigating the robotic mower 2 as they have been described above and are therefore not repeated again.

Figure 6:
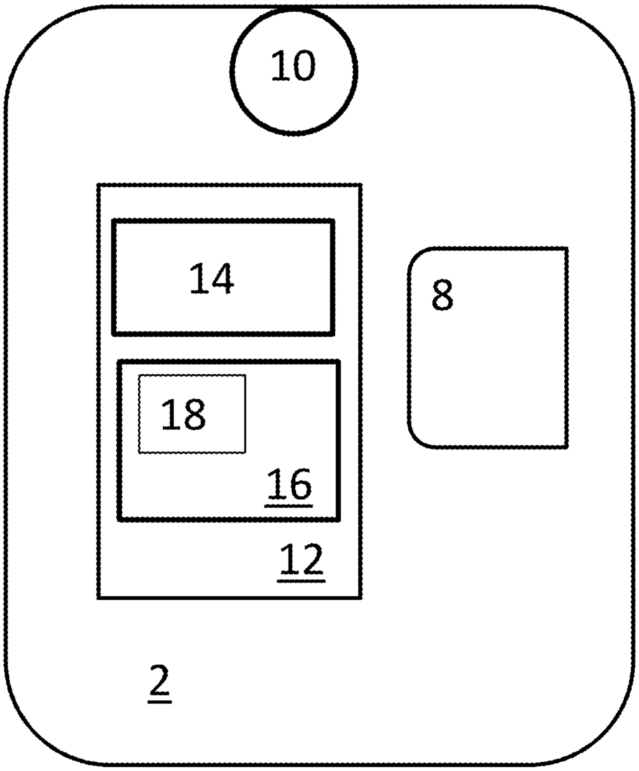
FIG. 6 is schematic view of the robotic mower, comprising a controller, a positioning unit and a dead reckoning sensor.

The present invention also relates to a computer program 18, see FIG. 6, comprising computer program code, and wherein the computer program code being adapted, if executed by the processer 14 of the controller 12, to implement the method and the different embodiments thereof for navigating the robotic mower 2 as have been described above.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." Further, the term "a number of", such as in "a number of wireless devices" signifies one or more devices. All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method for navigating a robotic mower (2) within a work area (4), wherein the work area (4) is limited by a boundary (6), the method comprising:

repeatedly determining (S100) a position of the robotic mower (2) by a satellite-based positioning receiver comprising at least one of a Real-Time Kinematic (RTK) receiver, a Global Positioning System (GPS) receiver, or a Differential Global Navigation Satellite System (DGNSS) receiver, provided in or arranged on the robotic mower (2), navigating (S102) the robotic mower (2) within the work area (4) based on the determined position, determining (S104) that a new position of the robotic mower (2) cannot be accurately obtained, determining (S106) a position uncertainty distance (R) based on the positions obtained by the satellite-based positioning receiver and a dead reckoning sensor (10) provided in the robotic mower (2), generating (S106.1) a trajectory (X) of the positions (pp1 . . . n) determined by the satellite-based positioning receiver while the robotic mower (2) navigates, generating (S106.2) a trajectory (Y) of the positions (pd1 . . . n) determined by the dead reckoning sensor (10) while the robotic mower (2) navigates, aligning (S106.3) by moving at least one of the generated trajectories (X, Y) within a 2D or 3D coordinate system for minimisation of the distance between the trajectories (X, Y) resulting in aligned trajectories (X, Y'), calculating (S106.4) a metric of difference (MOD) between the aligned trajectories (X, Y') for quantifying the alignment quality of the aligned trajectories (X, Y'), determining (S106.5) the position uncertainty distance (R) as the metric of difference (MOD) between the aligned trajectories (X, Y'), calculating (S108) a distance (D) to the closest boundary (6), determining (S110) a navigation margin as the difference between the distance (D) to the closest boundary (6) and the position uncertainty distance (R), and executing (S112) a safety operation if the navigation margin equals a predetermined value.

2. The method according to claim 1, wherein executing (S112) the safety operation comprises any one of:

stopping the robotic mower (2) to move, stopping the robotic mower (2) to move more than a robotic mower (2) length outside the boundary, and reversing or turning the robotic mower (2) for navigating the robotic mower (2) in the direction from the boundary (6)

or any combination thereof.

3. The method according to claim 1, wherein the distance (D) to the closest boundary (6) is the distance between the position determined by the positioning unit (8) and any one of:

the substantially closest point on the closest boundary (6), the substantially closest point on the closest boundary (6) in the mowing direction of the robotic mower (2), and the substantially closest point on the closest boundary (6) that the robotic mower (2) risks traversing based on a preplanned trajectory or any combination thereof.

4. The method according to claim 1, further comprising repeatedly determining (S114) a position of an RTK base station (22) with a positioning unit provided in the RTK base station (22), and wherein determining (S114) the position of the RTK base station (22) with the positioning unit is performed with a fixed time interval of between 5 to 15 seconds.

5. The method according to claim 1, wherein determining (S100) the position of the robotic mower (2) with the positioning unit (8) and the dead reckoning sensor (10) is performed with a fixed frequency of 8 to 12 Hz.

6. The method according to claim 1, wherein executing (S112) the safety operation comprises any one of:

stopping the robotic mower (2) to move, stopping the robotic mower (2) to move more than a robotic mower (2) length outside the boundary, and reversing or turning the robotic mower (2) for navigating the robotic mower (2) in the direction from the boundary (6)

or any combination thereof.

7. The method according to claim 1, wherein the distance (D) to the closest boundary (6) is the distance between the position determined by the positioning unit (8) and any one of:

the substantially closest point on the closest boundary (6), the substantially closest point on the closest boundary (6) in the mowing direction of the robotic mower (2), and the substantially closest point on the closest boundary (6) that the robotic mower (2) risks traversing based on a preplanned trajectory or any combination thereof.

8. A non-transitory computer-readable medium storing a computer program (18) comprising computer program code, the computer program code being adapted, if executed by the processor (14) of the controller (12), to implement the method according to claim 1.

9. A robotic mower (2) for performing navigating within a work area (4), wherein the work area (4) is limited by a boundary (6), the robotic mower (2) comprising a satellite-based positioning receiver, a dead reckoning sensor (10), a controller (12) comprising a processor (14) and a memory (16), the memory (16) comprising instructions which when executed by the processer (14) causes the mower to:

repeatedly determine a position of the robotic mower (2) the satellite-based positioning receiver comprising at least one of a Real-Time Kinematic (RTK) receiver, a Global Positioning System (GPS) receiver, or a Differential Global Navigation Satellite System (DGNSS) receiver, navigate the robotic mower (2) within the work area (4) based on the determined position, determine that a new position of the robotic mower (2) cannot be accurately obtained, determine a position uncertainty distance (R) based on the positions obtained by the satellite-based positioning receiver and the dead reckoning sensor (10), generate a trajectory (X) of the positions (pp1 . . . n) determined by the satellite-based positioning receiver while the robotic mower (2) navigates, generate a trajectory (Y) of the positions (pd1 . . . n) determined by the dead reckoning sensor (10) while the robotic mower (2) navigates, align by moving at least one of the generated trajectories (X, Y) within a 2D or 3D coordinate system for minimisation of the distance between the trajectories (X, Y) resulting in aligned trajectories (X, Y'), calculate a metric of difference (MOD) between the aligned trajectories (X, Y') for quantifying the alignment quality of the aligned trajectories (X, Y'), determine the position uncertainty distance (R) as the metric of difference (MOD) between the aligned trajectories (X, Y'), calculate a distance (D) to the closest boundary (6), determine a navigation margin as the difference between the distance (D) to the closest boundary (6) and the position uncertainty distance (R), and execute a safety operation if the navigation margin equals a predetermined value.

10. The robotic mower (2) according to claim 9, wherein the robotic mower (2) is further configured to execute the safety operation according to any one of:

stopping the robotic mower (2) to move, stopping the robotic mower (2) to move more than a robotic mower (2) length outside the boundary, and reversing or turning the robotic mower (2) for navigating the robotic mower (2) in the direction from the boundary (6)

or any combination thereof.

11. The robotic mower (2) according to claim 9, wherein the distance (D) to the closest boundary (6) is the distance between the position determined by the positioning unit (8) and any one of:

the substantially closest point on the closest boundary (6), the substantially closest point on the closest boundary (6) in the mowing direction of the robotic mower (2), and the substantially closest point on the closest boundary (6) that the robotic mower (2) risks traversing based on a preplanned trajectory or any combination thereof.

12. The robotic mower (2) according to claim 9, wherein the robotic mower (2) is further configured to:

repeatedly determine, with a fixed time interval between 5 to 15 seconds, a position of a RTK base station (22) with a positioning unit provided in the RTK base station (22).

13. The robotic mower (2) according to claim 9, wherein the robotic mower (2) is further configured to:

determine the positions of the robotic mower (2) with the positioning unit (8) and the dead reckoning sensor (10) with a fixed frequency of 8 to 12 Hz.

14. The robotic mower (2) according to claim 9, wherein the robotic mower (2) is further configured to execute the safety operation according to any one of:

stopping the robotic mower (2) to move, stopping the robotic mower (2) to move more than a robotic mower (2) length outside the boundary, and reversing or turning the robotic mower (2) for navigating the robotic mower (2) in the direction from the boundary (6)

or any combination thereof.

15. The robotic mower (2) according to claim 9, wherein the distance (D) to the closest boundary (6) is the distance between the position determined by the positioning unit (8) and any one of:

the substantially closest point on the closest boundary (6), the substantially closest point on the closest boundary (6) in the mowing direction of the robotic mower (2), and the substantially closest point on the closest boundary (6) that the robotic mower (2) risks traversing based on a preplanned trajectory or any combination thereof.

* * * * *